(12) United States Patent
Ols et al.

(10) Patent No.: US 9,568,197 B2
(45) Date of Patent: Feb. 14, 2017

(54) INTEGRATED FUEL NOZZLE WITH FEEDBACK CONTROL FOR A GAS TURBINE ENGINE

(75) Inventors: John T. Ols, Coventry, CT (US); Stephen K. Kramer, Cromwell, CT (US); Sheree R. Swenson-Dodge, Lebanon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 2140 days.

(21) Appl. No.: 11/774,701

(22) Filed: Jul. 9, 2007

(65) Prior Publication Data
US 2009/0013693 A1   Jan. 15, 2009

(51) Int. Cl.
  F23R 3/28   (2006.01)
  F23N 1/00   (2006.01)
  F23N 5/00   (2006.01)
  F23N 5/08   (2006.01)

(52) U.S. Cl.
  CPC ............ F23R 3/286 (2013.01); F23N 1/005 (2013.01); F23N 5/003 (2013.01); F23N 5/082 (2013.01); F23N 2041/20 (2013.01); Y02T 50/677 (2013.01)

(58) Field of Classification Search
  CPC .......... F23R 3/286; F23N 1/005; F23N 5/003; F23N 5/082
  USPC ............... 60/39.27, 39.281, 734, 752, 737, 740, 60/748
  See application file for complete search history.

(56) References Cited

U.S. PATENT DOCUMENTS

| | | | |
|---|---|---|---|
| 4,709,155 A | 11/1987 | Yamaguchi et al. | |
| 5,423,175 A * | 6/1995 | Beebe et al. | 60/39.281 |
| 5,615,555 A * | 4/1997 | Mina | 60/742 |
| 6,094,904 A | 8/2000 | Goodrich et al. | |
| 7,377,112 B2 * | 5/2008 | Spadaccini et al. | 60/772 |
| 2005/0247066 A1* | 11/2005 | Myhre | 60/803 |
| 2006/0000219 A1* | 1/2006 | Myhre | 60/772 |
| 2006/0107666 A1 | 5/2006 | Kothnur et al. | |
| 2006/0163065 A1* | 7/2006 | Benson et al. | 204/425 |

OTHER PUBLICATIONS

European Search Report for EP Application No. 08251631.1, May 7, 2012.

* cited by examiner

Primary Examiner — Craig Kim
(74) Attorney, Agent, or Firm — Carlson, Gaskey & Olds, P.C.

(57) ABSTRACT

A gas turbine engine includes a combustor having a fuel nozzle assembly for delivering fuel to a combustion chamber. A sensor is at least partially housed within the fuel nozzle assembly for sensing a parameter associated with the delivery of fuel to the combustion chamber. In one example, the sensor is an optical sensor coupled to an optical decoder for ascertaining the parameter. A trim valve is in communication with the fuel nozzle assembly. A controller is in communication with the sensor and is programmed to actuate the trim valve to adjust the amount of fuel delivered through the fuel nozzle assembly in response to the parameter. In one example, an end of the optical sensor is arranged near a fuel exit of the fuel nozzle assembly. The controller actuates the trim valve for the fuel nozzle assembly to achieve a desired air/fuel ratio and/or balance the fuel delivery of the fuel nozzle assembly relative to another fuel nozzle assembly within the gas turbine engine's combustor system.

2 Claims, 1 Drawing Sheet

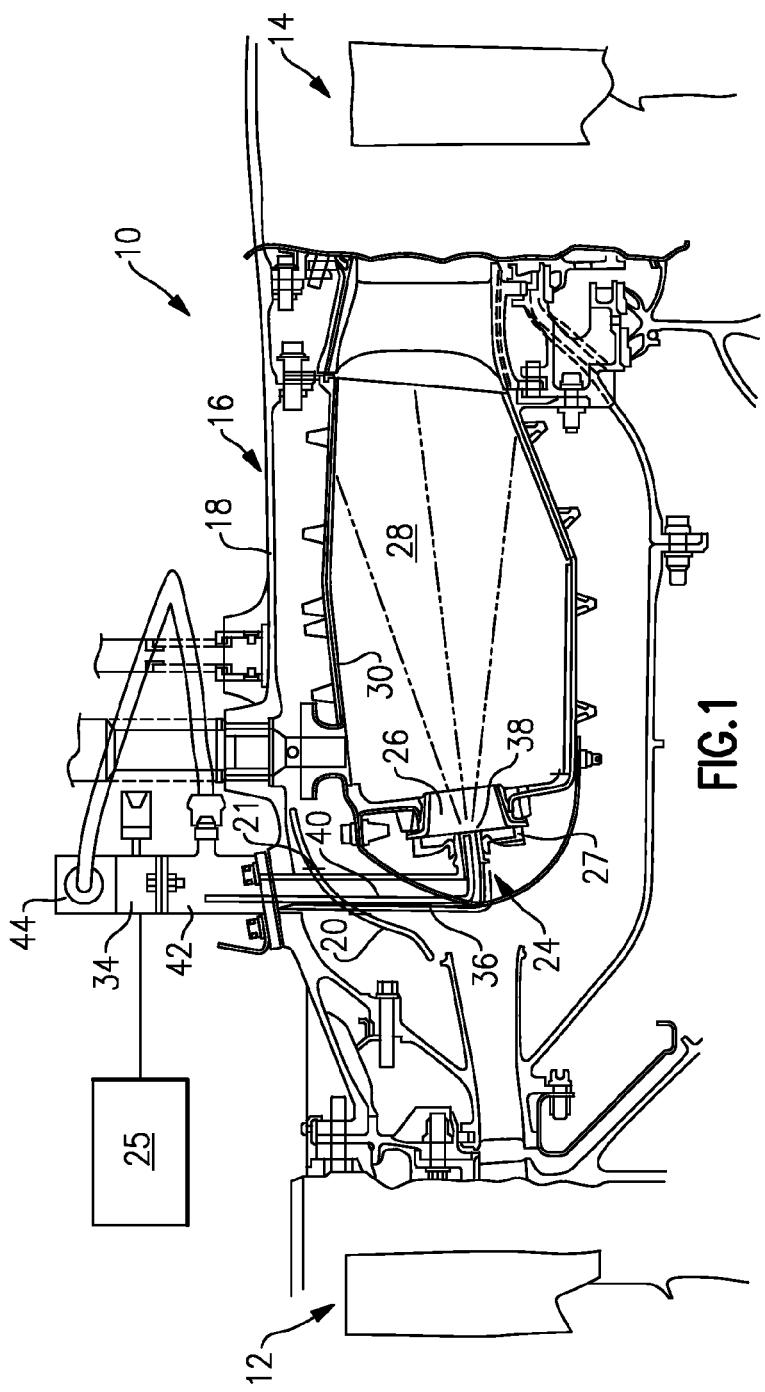
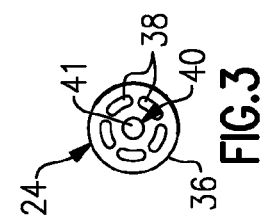
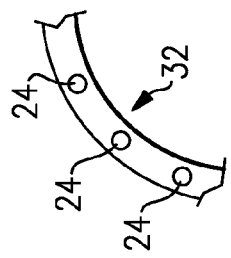

INTEGRATED FUEL NOZZLE WITH FEEDBACK CONTROL FOR A GAS TURBINE ENGINE

This invention was made with government support with the United States Air Force under Contract No.: F33615-98-2-2903. The government therefore has certain rights in this invention.

BACKGROUND OF THE INVENTION

The present invention relates to a gas turbine engine combustor system, and more particularly, the invention relates to a fuel nozzle having a sensor to provide feedback control for the combustor system.

Gas turbine engines typically include a combustor system having multiple fuel nozzles. It is desirable to balance the fuel delivered by the fuel nozzles relative to one another to achieve uniform combustion across the combustor system and improve fuel efficiency. To this end, feedback control systems have been proposed and used on industrial gas turbine engines. Industrial gas turbine engines that use feedback controls employ a separate sensor, valve and fuel nozzle. Such a solution is too heavy for an aircraft gas turbine engine. Furthermore, separate components require additional penetrations into a housing diffuser case in the combustor system. Industrial gas turbine engine feedback control systems also have not been employed in gas turbine engines used on aircraft due to elevated temperatures and pressures in the combustor system of these engines.

What is needed is a feedback control system for a combustor system of an aircraft gas turbine engine that does not significantly increase weight, reduce reliability, or compromise the structural integrity of the engine. It is also desirable that the feedback control system be robust and easily replaced.

SUMMARY OF THE INVENTION

A gas turbine engine includes a combustor having a fuel nozzle assembly for delivering fuel to a combustion chamber. A sensor is at least partially housed within the fuel nozzle assembly for sensing a parameter associated with the delivery of fuel to the combustion chamber. In one example, the sensor is an optical sensor coupled to an optical decoder for ascertaining the parameter. A trim valve is in communication with the fuel nozzle assembly. A controller is in communication with the sensor and is programmed to actuate the trim valve to adjust the amount of fuel delivered through the fuel nozzle assembly in response to the parameter.

In one example, an end of the optical sensor is arranged near a fuel exit of the fuel nozzle assembly. The optical sensor "sees" into the combustion chamber and detects at least one of oxygen, nitrogen, water, carbon monoxide, carbon dioxide, and a hydrocarbon to determine an air fuel ratio within the combustion chamber, in one example. The controller actuates the trim valve for the fuel nozzle assembly to achieve a desired air/fuel ratio and/or balance the fuel delivery of the fuel nozzle assembly relative to another fuel nozzle assembly within the gas turbine engine's combustor system.

These and other features of the present invention can be best understood from the following specification and drawings, the following of which is a brief description.

BRIEF DESCRIPTION OF THE DRAWINGS

FIG. 1 is a cross-sectional view of a portion of a combustor system illustrated schematically between a compressor section and a turbine section of a gas turbine engine.

FIG. 2 schematically illustrates a portion of an annular combustor system.

FIG. 3 is an end view of an example fuel nozzle assembly including a sensor.

DETAILED DESCRIPTION OF THE PREFERRED EMBODIMENT

A gas turbine engine 10 is shown in FIG. 1. The engine 10 includes a combustor system 16 arranged between a compressor section 12 and a turbine section 14. The engine 10 includes a housing 18. The housing 18 includes a diffuser case 20 arranged between the compressor section 12 and the combustor system 16.

A fuel source 25 provides fuel to a fuel nozzle 24 for delivery to a combustion chamber 28. The fuel nozzle 24 extends through an aperture 21 in the diffuser case 20. An end of the fuel nozzle 24 is arranged at an inlet 26 of the combustion chamber 28. A swirler 27 provides desired airflow motion from the compressor section 12 to achieve a desired air/fuel mixture. A wall 30 of the combustion chamber 28 typically includes one or more igniters used to begin combustion of the air/fuel mixture.

In one example, the combustion system 16 includes an annular combustor 32, which is schematically depicted in FIG. 2. An annular combustor 32 includes multiple fuel nozzles 24, which each include their own trim valve 34, in one example (only one of which is illustrated in FIG. 1). In one example, each fuel nozzle 24 delivers fuel to a respective section of the combustion chamber 28.

Referring to FIG. 1, the fuel nozzle 24 includes a nozzle housing 36 terminating in a fuel exit 38 that delivers fuel to the combustion chamber 28. A sensor 40 is at least partially arranged within the nozzle housing 36. Fuel provided by the fuel source 25 to the fuel nozzle 24 cools the sensor 40. In one example shown in FIG. 3, an end 41 of the sensor 40 is arranged near the fuel exit 38 of the nozzle housing 36. The nozzle housing 36 shields the sensor 40 from the harsh environment of the combustor system 16. Introducing the sensor 40 to the combustor system 16 using the fuel nozzle 24 does not require additional apertures to be provided in the diffuser case 20 or other portions of the housing 18.

In one example, the sensor 40 is an optical sensor. An ion sensor or pressure sensor may also be used, for example. The sensor 40 can be provided by sapphire or quartz fibers or any other suitable material. The sensor 40 communicates with an optical decoder 42. In one example, the fuel nozzle 24, trim valve 34, sensor 40 and optical decoder 42 are integrated to provide an easily replaceable unit. Such an integrated unit also reduces external electrical connections. The sensor 40 detects a fuel delivery parameter associated with the combustor system 16. In one example, the sensor "sees" a cone-shaped field of view into the combustion chamber 28 in a wave length spectrum capable of detecting an amount of fuel, oxygen, nitrogen, water, carbon monoxide, carbon dioxide, and/or hydrocarbon, for example.

A controller 44 communicates with the sensor 40 through the optical decoder 42 in the example. Using the detected fuel delivery parameter, the controller 44 can determine an air/fuel ratio within a given combustion chamber 28. The controller 44 is programmed to actuate the trim valve 34 to achieve a desired air/fuel ratio within the combustion chamber 28 and/or, balance the air/fuel ratio and/or fuel delivery to that of another combustion chamber 28. The controller 44 is used, for example, to minimize differences between the combustion chambers 28 within a combustion system thereby increasing overall fuel efficiency. Smoke, particulates and other engine emissions are also reduced.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A fuel nozzle assembly comprising:
    a fuel nozzle providing a housing at least partially shielding an optical sensor, the sensor configured to detect a fuel delivery parameter, wherein the fuel nozzle includes a fuel exit, and an end of the sensor is arranged near the fuel exit;
    an optical decoder supported by the housing and in communication with the optical sensor;
    a trim valve supported by the housing and configured to regulate a flow of fuel to the fuel exit; and
    wherein the fuel nozzle, the optical sensor, the optical decoder and the trim valve provide an integrated unit with the housing and replaceable as a unitary assembly.

2. The fuel nozzle system according to claim 1, wherein the fuel delivery parameter includes at least one of oxygen, nitrogen, water, carbon monoxide, carbon dioxide and a hydrocarbon.

\* \* \* \* \*

UNITED STATES PATENT AND TRADEMARK OFFICE
CERTIFICATE OF CORRECTION

PATENT NO. : 9,568,197 B2  Page 1 of 1
APPLICATION NO. : 11/774701
DATED : February 14, 2017
INVENTOR(S) : John T. Ols, Stephen K. Kramer and Sheree R. Swenson-Dodge It is certified that error appears in the above-identified patent and that said Letters Patent is hereby corrected as shown below:

In the Claims

In Claim 2, Column 3, Line 27; after "The fuel nozzle" replace "system" with --assembly--

Signed and Sealed this
Nineteenth Day of June, 2018

Andrei Iancu
*Director of the United States Patent and Trademark Office*